United States Patent [19]

Dotzer et al.

[11] Patent Number: 4,983,013
[45] Date of Patent: Jan. 8, 1991

[54] OPTICAL CABLE COMPRISING A CARRIER MEMBER

[75] Inventors: Peter Dotzer, Munich; Heinz Glaser, Germering; Ernst Mayr, Starnberg; Ulrich Oestreich, Munich, all of Fed. Rep. of Germany

[73] Assignee: Siemens Aktiengesellschaft, Berlin and Munich, Fed. Rep. of Germany

[21] Appl. No.: 398,662

[22] Filed: Aug. 25, 1989

[30] Foreign Application Priority Data

Aug. 30, 1988 [DE] Fed. Rep. of Germany ....... 3829410

[51] Int. Cl.$^5$ .............................................. G02B 5/16
[52] U.S. Cl. .................................... 350/96.23; 174/97
[58] Field of Search ............... 350/96.23; 174/97, 115; 138/115

[56] References Cited

U.S. PATENT DOCUMENTS 4,199,224 4/1980 Oestreich .......................... 350/96.23

FOREIGN PATENT DOCUMENTS 0282806 12/1986 Japan .

Primary Examiner—Akm Ullah
Attorney, Agent, or Firm—Hill, Van Santen, Steadman & Simpson

[57] ABSTRACT

An optical cable comprising a carrier member extending in a longitudinal direction and having outwardly accessible chambers receiving light waveguides, each of said chambers being separated from one another by a web characterized by a depression being formed in each of said webs to enlarge the heat-emitting surfaces and to remove undesirable accumulation of material in the region of the carrier members. The depressions preferably have a V-shaped cross section, and are smaller than the channels and are able to receive additional elements, which may include waveguides, tensile elements or electrical conductors. Each of the V-shaped depressions can also e used as a gas channel when the optical cable is to operated in a gas-pressure monitored fashion.

15 Claims, 1 Drawing Sheet

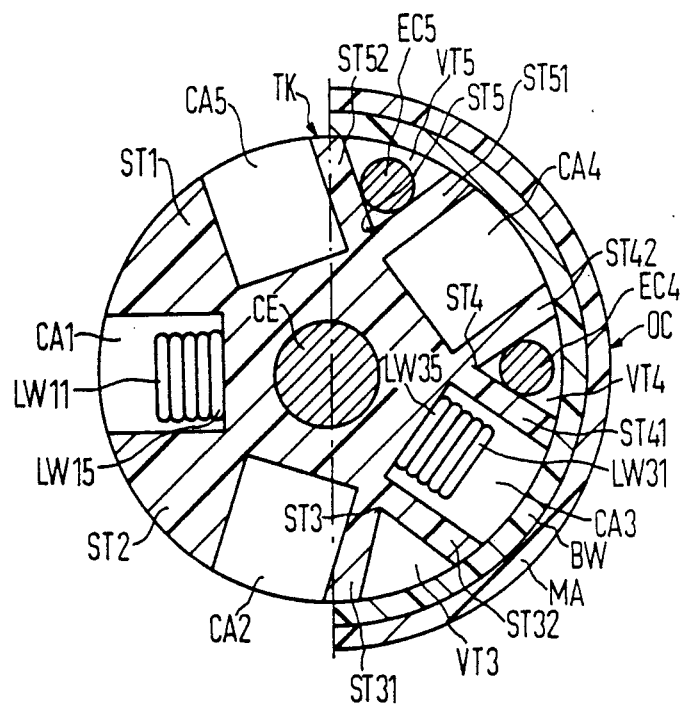

OPTICAL CABLE COMPRISING A CARRIER MEMBER

BACKGROUND OF THE INVENTION

The present invention is directed to an optical cable comprising a longitudinally extending carrier member having outwardly accessible chambers which are helically wrapped on said member and extend in a longitudinal direction, said chambers serving for the acceptance of light waveguides, whereby the chambers are separated from one another by webs.

A cable having a longitudinally extending carrier having outwardly extending chambers, which extend helically in the longitudinal direction and are separated by webs, is disclosed in German Patent No. 24 49 439. The chambers of this patent have a profile that expands outwardly in a sector fashion and the webs separating adjacent chambers have a substantially constant thickness.

In many applications, it is necessary to provide chamber profiles other than exactly sector-shaped chamber profiles. For example, chambers having a rectangular cross section or profile are desirable, for instance when stacks of small bands are placed in these chambers. For examples, stacks of light waveguide arrangements wherein a respective plurality of light waveguides are arranged next to one another in the fashion of ribbon cable and these cables are arranged as a stack of cables. Such a stack of small bands has an approximately rectangular contour or shape along the outside and, accordingly, the cross section of the chamber should also be designed approximately rectangularly. On the other hand, ribbon-shaped elements can easily dislocate relative to one another, twist, turn and, thus, suffer additional local attenuations over the entire cable length on an average. It is, thus, expedient for a stack of ribbon-shaped elements to be limited from lateral play in a defined fashion.

In chamber cross sections that are not exactly sector-shaped but are rectangular profiles, problems will occur that the webs comprise unequal material cross sections. For example, the thinner wall thickness will occur closer to the axis of the carrier and the webs will taper with the greater wall thickness turning towards the radial outer portion of the carrier. When a carrier member containing rectangular chambers is manufactured by extruding, undesirable deformation of the chamber profile will occur during cooling as a consequence of the non-uniform distribution of material in the webs.

SUMMARY OF THE INVENTION

The object of the present invention is to largely avoid such an undesirable accumulation of material in the region of the carrier member insofar as possible and, thereby, simultaneously enlarge the heat-emitting surface such that the solidification of the web proceeds far more quickly and more uniformly. Further, the invention is based on the object of creating supplementary possibilities for additional properties or, respectively, measures within the framework of the optical cable.

Accordingly, the invention is directed to an improvement of an optical cable adding a longitudinally extending carrier member which has a plurality of chambers extending helically and longitudinally on an outer surface of the member with each of the chambers being separated by a web of the carrier member. The improvements are that each of the webs are provided with an additional depression which has a cross sectional shape different than that of the chamber.

These additionally applied, outwardly extending depressions, thus, have a double function. First, they cause the part of the undesired accumulation of the material otherwise occurring in the web region to be eliminated in the outer region due to the presence of the depression. A second advantage is the cooling surfaces become enlarged whereby the possibility is additionally created of accommodating other or additional elements in the depressions and of using these elements for different jobs.

A first possibility for the exploitation of the additional depressions comprises that they serve for the acceptance of additional individual light waveguides. Another possibility for the exploration of the additional depressions is established in that these can be utilized for the acceptance of electrical conductors, for example electrical conductors that are required for the remote feed of intermediate repeaters. It is also possible to provide tensile elements in the additional depressions that serve either as tensile strength reinforcements which, for example, are important when laying the cable, or that serve for pre-stretching the chamber elements as a result whereof the mechanical pre-stretching of the chamber elements before the insertion that is otherwise standard can be eliminated. The expansion of the clamping or tensile elements upon insertion is generated by deceleration. Aramid yarns are especially suitable for this purpose.

Another possibility for the additional exploitation of the outwardly opening depressions is that they can be used as gas channels wherein the respective optical cable is to be operated in a gas-pressure monitored fashion.

A still further possibility is to utilize the depressions to receive a mixed group of elements, for example electrical conductors which are provided in two depressions, a gas channel arranged in the third depression and additional light waveguides arranged in the fourth and fifth depressions.

All potential additional elements are expediently inserted together with the light waveguide which, as mentioned above, are in the ribbon form and are introduced in the chambers of the cable core in a single pass so that the cable core is finished in this pass. Pre-stressing elements of steel wires or aramid yarns thereby require additional, strong and precise run-off brakes.

Other advantages of the invention moreover can be seen wherein the outlay for material for the manufacture of the carrier can be reduced.

Other features and advantages of the invention will be readily apparent from the following description of the preferred embodiment, the drawing and claims.

BRIEF DESCRIPTION OF THE DRAWING

The Figure is a cross sectional view having the left-hand side showing the conventional carrier member with ribbons and the right-hand side showing the improvements of the conventional carrier member in accordance with the present invention.

DESCRIPTION OF THE PREFERRED EMBODIMENTS

The principles of the present invention are particularly useful when incorporated in a carrier member TK which has a plurality of outwardly opening chambers CA1–CA5 which have a rectangular cross section and proceed helically on an outer surface of the carrier in the longitudinal direction of the cable. The carrier member TK includes a central element, preferably of steel wire or a high-strength aramid yarn CE, on which the carrier member TK has been applied by extrusion. The rectangular chambers CA1–CA5 serve for the acceptance of light waveguides, which are preferably arranged in a ribbon form, as indicated by the waveguides in the chambers CA1 and CA3. Respectively, five such ribbons, such as LW11–LW15, are shown in a stack in the chamber CA1, and five ribbons, such as LW31–LW35, are shown in a stack in the chamber CA3. The individual ribbons should be movable relative to one another to a certain extent and should also comprise a certain play within the chamber. In principle, the ribbons have, respectively, up to twelve fibers per ribbon, and each of the stacks can have up to twelve ribbons arranged in the stack-like configuration.

As a consequence of the approximately rectangular chamber cross section, illustrated by the chambers CA1–CA5, the parting webs lying therebetween exhibit a highly non-uniform distribution of material, such that there is an accumulation of material rising in the outer region. As illustrated by the webs ST1 and ST2, the webs have a triangular configuration with the thickness of the web increasing as the radial distance from the center of the carrier member increases. This non-uniform distribution of the material slows up the cooling after extrusion and will cause a creation of internal stresses in these webs. When extruding the carrier member TK, such an accumulation material in the region of the webs ST1 and ST2 can lead to difficulties because, for example, a certain non-uniform deformation occurs during cooling that can lead to an undesirable change in the chamber cross section.

In order to counter these difficulties, as shown in the right-hand part of the Figure, the present invention's improvement has the accumulation of material in the region of the webs being largely avoided insofar as possible by the provision of additional depressions, such as VT3, VT4 and VT5. Each of these depressions VT3–VT5 have a triangular or sector-shape cross section and the cross sectional area of each of the depressions is different than the cross sectional area of the chambers, such as CA1–CA5. The presence of each of these depressions VT3, VT4 and VT5 makes the web, such as ST3, into two web portions or double-web portions ST31 and ST32. In a similar manner, - the depression VT4 makes the web ST4 have two portions ST41 and ST42 and the depression VT5 makes the web ST5 have two portions, such as ST51 and ST52. The wall thickness of these web portions, such as ST31 and ST32, is approximately constant, as the radial distance of the web increases from the center of the carrier. Thus, the web portions, such as ST41 and ST42, have substantially the same thickness from the inside toward the outside and are expediently selected to equal one another so that a uniform distribution of the material with respect to the web is achieved in the improvement of the cable, as shown in the right-hand part of the drawing, and the cooling surfaces are roughly doubled.

The depressions, such as VT3, VT4 and VT5, form in this fashion can be utilized for solving additional jobs. For example, additional elements, such as elements EC4 and EC5, can be respectively accommodated in part of or in all depressions. These additional elements are entirely or partially fashioned to be electrically conductors or being utilized for utilization as power supply purpose, for example, given line repeaters. It is also possible to utilize the depression as gas channels in cables which are monitored for gas pressure or to insert mechanical tensile elements that, for example, can serve the purpose of promoting the tensile strength of the central element. It is also possible to insert tensile elements, that have been pre-stressed, into the depressions, such as VT4 and VT5, for example in the form of steel wires or aramid yarns whereby the mechanical pre-stretching of the chamber elements before the insertion of the fibers in order to achieve excess fiber lengths can be eliminated. These pre-stressed elements then, subsequently, lead to a compression of the chamber elements in a longitudinal direction and, thus, to the creation of excess length in the ribbon elements. Finally, of course, it is also possible to co-utilize the depressions for the accommodations of additional light waveguides, i.e., to also accommodate individual light waveguides or light waveguide groups in the triangular depressions.

As illustrated in the right-hand portion of the drawing, the open chambers, as well as the depressions, can be closed with a winding BW, for example in the form of a band or thread, and at least one cable jacket, such as MA, can be applied on the outside of the winding.

Although various minor modifications may be suggested by those versed in the art, it should be understood that we wish to embody within the scope of the patent granted hereon all such modifications as reasonably and properly come within the scope of our contribution to the art.

We claim:

1. In an optical cable having a longitudinally extending carrier member having outwardly extending integral webs extending helically in a longitudinal direction of the member to form outwardly accessible, helically extending chambers, said chambers serving for the acceptance of light waveguides and being separated from one another by said webs, the improvements comprising an outer surface of each of the webs having an outwardly opening depression having a cross sectional area smaller than a cross sectional area of the chambers.

2. In an optical cable according to claim 1, wherein the depressions divide each of the webs into two portions having essentially constant wall thickness.

3. In an optical cable according to claim 1, wherein said depressions receive additional elements.

4. In an optical cable according to claim 3, wherein said additional elements include individual light waveguides.

5. In an optical cable according to claim 3, wherein the additional elements include electrical conductors.

6. In an optical cable according to claim 3, wherein the additional elements include longitudinally extending tensile elements.

7. In an optical cable according to claim 6, wherein said longitudinal tensile elements are pre-stressed elements.

8. In an optical cable according to claim 1, wherein said depressions are employed as gas channels.

9. In an optical cable according to claim 1, wherein each depression has a roughly triangular cross section.

10. In an optical cable having a longitudinally extending carrier member having outwardly accessible chambers extending helically in a longitudinal direction of the member, said chambers serving for the acceptance of light waveguides and being separated from one another by webs, the improvements comprising each of the webs having an outwardly opening depression having a cross sectional area smaller than a cross sectional area of the chambers, each chamber having a roughly rectangular cross section and each of the depressions having a roughly triangular cross section.

11. In an optical cable having a longitudinally extending carrier member having outwardly accessible chambers extending helically in a longitudinal direction of the member, said chambers serving for the acceptance of light waveguides and being separated from one another by webs, the improvements comprising each of the webs having an outwardly opening depression having a cross sectional area different from a cross sectional area of the chambers, each of the chambers having a roughly rectangular cross sectional and each of the depressions having a roughly triangular cross section.

12. In an optical cable according to claim 11, wherein each of the triangular depressions receives an additional element.

13. In an optical cable according to claim 12, wherein at least one of the additional elements is an individual light waveguide.

14. In an optical cable according to claim 13, wherein at least one of the additional elements received in said depressions includes an electrical conductor.

15. In an optical cable according to claim 14, wherein at least one of the additional elements received in the depressions is a longitudinally extending tensile element.

* * * * *